United States Patent

Gueldenpfennig

[15] 3,637,944

[45] Jan. 25, 1972

[54] PATH-FINDING SYSTEM FOR RELAY-TYPE CROSS-POINT MATRIX NETWORKS

[72] Inventor: Klaus Gueldenpfennig, Penfield, N.Y.

[73] Assignee: Stromberg-Carlson Corporation, Rochester, N.Y.

[22] Filed: Nov. 25, 1970

[21] Appl. No.: 92,566

Related U.S. Application Data

[63] Continuation-in-part of Ser. No. 782,078, Dec. 9, 1968, Pat. No. 3,585,309.

[52] U.S. Cl. ....................179/18 GE
[51] Int. Cl. ....................H04q 3/49
[58] Field of Search ....................179/18 GE, 18 AB, 18 EA

[56] References Cited

UNITED STATES PATENTS 3,288,939 11/1966 Spellnes....................179/18 GE

*Primary Examiner*—Kathleen H. Claffy
*Assistant Examiner*—Thomas W. Brown
*Attorney*—Charles C. Krawczyk

[57] ABSTRACT

A path-finding system for interconnection of circuits through a switching network, wherein the network includes a plurality of matrix stages interconnected to provide plural paths between circuits connected to opposite ends of the network and wherein each stage is divided into separate matrix groups. The matrix groups comprise cross-point relays having control and hold coils. The mark coils are interconnected between adjacent stages by mark leads for controlling the actuation of the cross-point relays and the hold coils are interconnected by hold leads for maintaining the relays actuated. Guard relays are included in the mark leads between two of the matrix stages. The circuits at opposite ends of the network to be connected are marked. The busy-free conditions of the individual hold leads connected to a selected one of the matrix groups between two of the network stages are scanned to locate a free path. A circuit responsive to the detection of a free hold lead completes the connection through the network and interconnects the marked circuits.

6 Claims, 5 Drawing Figures

INVENTOR.
KLAUS GUELDENPFENNIG
BY
Charles C. Krawczyk
ATTORNEY

PATENTED JAN 25 1972

3,637,944

SHEET 2 OF 5

INVENTOR.
KLAUS GUELDENPFENNIG

BY
Charles C. Krawczyk

ATTORNEY

INVENTOR.
KLAUS GUELDENPFENNIG
BY
Charles C. Krawczyk
ATTORNEY

INVENTOR.
KLAUS GUELDENPFENNIG

BY

Charles C. Krawczyk

ATTORNEY

KLAUS GUELDENPFENNIG
INVENTOR.

BY Charles C. Krawczyk
ATTORNEY

PATH-FINDING SYSTEM FOR RELAY-TYPE CROSS-POINT MATRIX NETWORKS

BACKGROUND OF THE INVENTION

This application is a continuation-in-part of a patent application, Ser. No. 782,078, now U.S. Pat. No. 3,585,309 entitled "Crosspoint Network Path Finding System," filed on Dec. 9, 1968, for Klaus Gueldenpfenning.

The present invention relates to telephone switching systems and particularly to an improved system for selecting free links in a multistage switching network.

The invention is especially suitable for use in a semiautomatic switching system, such as may be exemplified by the Bell Telephone 304 system wherein a large number of calls may be set up with minimal operator assistance. The invention, however, is suitable for use in automatically providing connections between lines both rapidly and efficiently without redundant or duplicate connections in any application where signalling or other communication services are desired.

Many types of matrix switching networks have been suggested for providing connections between selected inlets and outlets. However, in order to provide rapid switching action in establishing the path, a large multiplicity of alternate routes are generally required. Each of these routes requires several cross-points (viz a relay or relays and several contacts). Compromises between switching speed and hardware complexity therefore have been required. It is a feature of this invention to provide rapid switching with a minumum of hardware. For example, existing switching systems generally require several guard relays for each possible path. When a path is established, the guard relays associated therewith operate and prevent duplicate use of that path. It is a feature of this invention to eliminate a large number of such guard relays.

In order to increase switching speed, it is necessary to mark a connected link as busy in order to prevent loss of time in attempting path finding through links which are not available for use. In order to achieve this objective, many switching systems have provided separate means which have increased the complexity and cost of the system. It is a feature of this invention to effect both functions of selecting available links and marking such links as busy with essentially the same hardware, thus, decreasing the cost and increasing the reliability of the switching system.

In order to accommodate various marking and selecting functions, it has often been necessary to provide separate sources of power, such as DC busses, in the switching system. Inasmuch as bus wiring and its ancillary fusing requires space which otherwise could be allotted to additional links, it has been difficult to miniaturize the switching system to the extent desired. For example, it is desirable to accommodate the switching system in a few cabinets. It is a feature of this invention to provide a switching system which does not require power within the switching matrix stages.

Accordingly, it is an object of the present invention to provide an improved automatic switching system.

It is a further object of the present invention to provide an improved automatic switching system which uses relay cross-point matrices.

It is a further object of the present invention to provide an improved electronic control system for rapidly establishing connections through a switching network.

It is a further object of the invention to provide an improved electronic control system for a plural stage switching network made up of individual switching matrices in each stage.

It is a still further object of the present invention to provide an improved automatic switching system which provides rapid path selection while, at the same time, ensures against duplicate selection of the same path and yet eliminates many components, such as guard relays, which have previously been required in such systems.

It is a further object of the present invention to provide an improved electronic switching system which is operative to select links and mark them busy without separate devices for accomplishing each of these functions.

It is another object of the present invention to provide an improved electronic switching system operative at high speed to select free links by automatically being conditioned to avoid busy links.

It is a still further object of the present invention to provide an improved switching system utilizing cross-point matrices wherein the need for power and buss wiring within the matrix is eliminated.

It is still another object of the present invention to provide an improved electronic switching system utilizing reed relay matrices which may be made relatively small in size through the elimination of wiring fusing and relays which have previously been required.

It is still another object of the present invention to provide an improved electronic switching system which may be manufactured at low cost without sacrificing reliability.

BRIEF DESCRIPTION OF THE INVENTION

A path-finding system for interconnection of circuits through a switching network, wherein the network includes a plurality of matrix stages interconnected to provide plural paths between circuits connected to opposite ends of the network. The matrix stages include cross-point switches comprised of relays having control and hold coils. The circuits at opposite ends of the network to be connected are marked. The busy-free condition of the individual links connected to one stage are scanned to determine the presence of an established connection to the hold coils. Circuit means responsive to the detection of a free condition in a link completes the connection through the network and interconnects the marked circuits.

DESCRIPTION OF THE PREFERRED EMBODIMENTS

Figure 1:
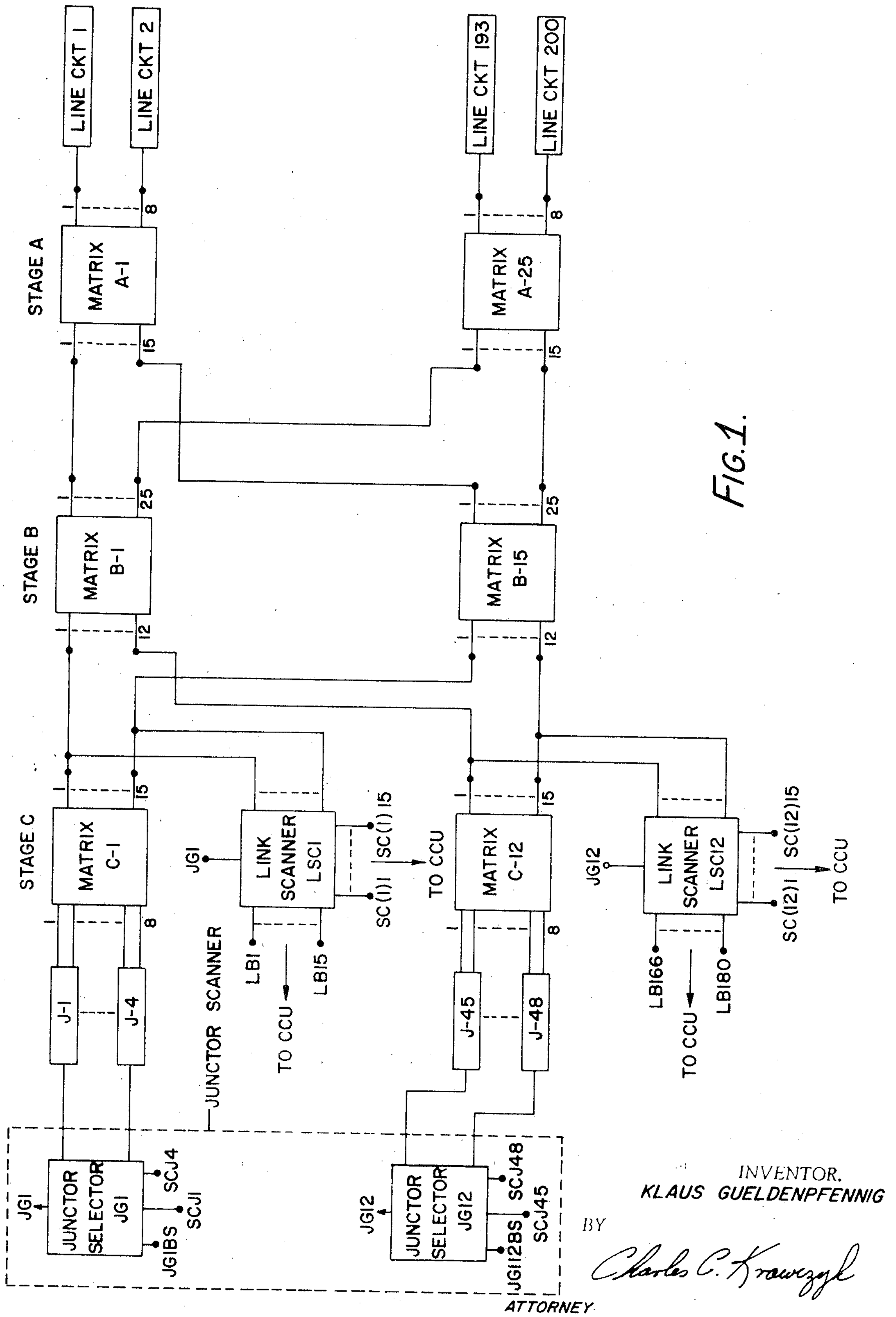
FIG. 1 is a simplified block diagram of an automatic switching system embodying the invention.

Referring more particularly to FIG. 1, the basis of the switching system is a plural stage full availability switching matrix having three stages A, B and C. Each stage contains a plurality of matrix stages which are interconnected so as to provide, in the system depicted herein for purposes of illustration, 200 possible connections between line circuits at the inlet end of the matrix and 48 junctors having 96 ports at the outlet end thereof. Inasmuch as a 200 line system is depicted herein, the first stage A is provided with 25 matrices A1 through A25. The second stage B has 15 matrices B1 through B15, while the last or secondary stage C has 12 matrices C1 through C12. The matrices are interconnected such that any one inlet thereto can find a link to any of its outlets. In matrix A1, for example, there are eight inlets which can be connected selectively to any of 15 outlets.

Line circuits are connected to the stage A matrices in groups, eight-line circuits constituting a group. Thus, line circuits 1 through 8 are respectively connected to inlets 1 through 8 through matrix A1. The final group of eight-line circuits 193 to 200 are respectively connected to inlets 1 through 8 of matrix A25. The intermediate matrices and their associated line circuits have not been shown in order to simplify the illustration.

Outlets 1 through 15 of matrix A1 are connected to inlet 1 of matrices B1 through B15, respectively, and the outlets of succeeding matrices are connected to correspondingly numbered inlets of the matrices B1 through B15. The outlets of the matrices in stage B are similarly connected to the inlets of the matrices in stage C. For further information respecting the interconnection of matrices in the manner described above, reference may be had to an article entitled "A Study of Non-Blocking Switching Networks" by C. Clos, which appeared in the "Bell System Technical Journal," March 1953, pages 406–424.

The inlets of the stage C matrices are connected to the junctors served by junctor selectors. Four junctors, each having a calling (ing) and called (ed) lines are associated as a junctor group with each of the matrices C1 through C12. Junctors J1 through J4 which constitute the first junctor group JG1 are associated with matrix C1. The remaining junctor groups JG1 are similarly connected by junctor selectors for their respective groups to matrices C2 through C12. Thus, junctors J45 through J48 are connected by the junctor selectors for JG12 to matrix C12.

The junctor selectors receive scanning inputs from the central control unit (CCU) which is associated with the switching system. This control unit may include a nonhoming marking system which is similar to the link scanners associated with stage C, to be discussed hereinafter. Briefly, each junctor includes digital logic, such as a flip-flop, which is conditioned to store information as to whether or not a junctor is in use, thereby marking that junctor as busy and precluding the establishment of a connection between that junctor and its associated matrix. Upon occurrence of the first scanning pulse associated with a free junctor, connections are made through the free junctor selector which permits a connection of that free junctor to its associated scanning matrix. When all of the junctors in a group are busy, a junctor group busy level is provided (e.g., JG1BS for the free junctor selector JG1) which precludes selection of the junctor group.

Link scanners LSC1 through LSC12 are associated respectively with matrices C1 through C12. When a free junctor is selected, the common control unit provides a signal level on a terminal for the link scanner connected to the matrix group which is associated with the selected junctor group (e.g., if one of the junctors J1 through J4 in junctor group JG1 is selected, a signal level is provided on terminal JG1 of link scanner LSC1). The common control generates scanning pulses at relatively high speed (say 480 kHz.). When a link is to be selected, one of these pulses appears on the scanning terminals of the link scanner allocated thereto (viz SC(1)1 through SC(1)15 for the link scanner LSC1 through SC(12)1 to SC(12)15 for the link scanner LSC12). Each scanning pulse is associated with a different link in its respective matrix (e.g., SC(1)1 is associated with the first link or link 1 out of the 15 links available in matrix C1). Any links that are used or busy are marked by an appropriate link busy signal LB1 through LB180 which are applied to the link scanners. Thus, the first free link which is encountered is utilized and a connection is extended therethrough to the selected junctor. This connection is then extended through a free link in stage B. A line circuit to which service is desired is marked and the connection is then extended through the matrix of stage A which is connected to the marked line circuit. Thus, for example, for each line circuit which is marked, a link is extended to one of the 15 available links in matrix A1 to line circuit 1 and thence through any of the 375 links available in stage B to the selected link in stage C1.

Ringing or busy signals to a subscriber connected to a line circuit are provided via the subscriber line connected between the subscriber station and the line circuit. The audio or voice path is provided through cross-point contacts of the relays which establish the switching path, such that the talking path corresponds to the switching path. The talking path may be two or four wire as desired.

Figure 2:
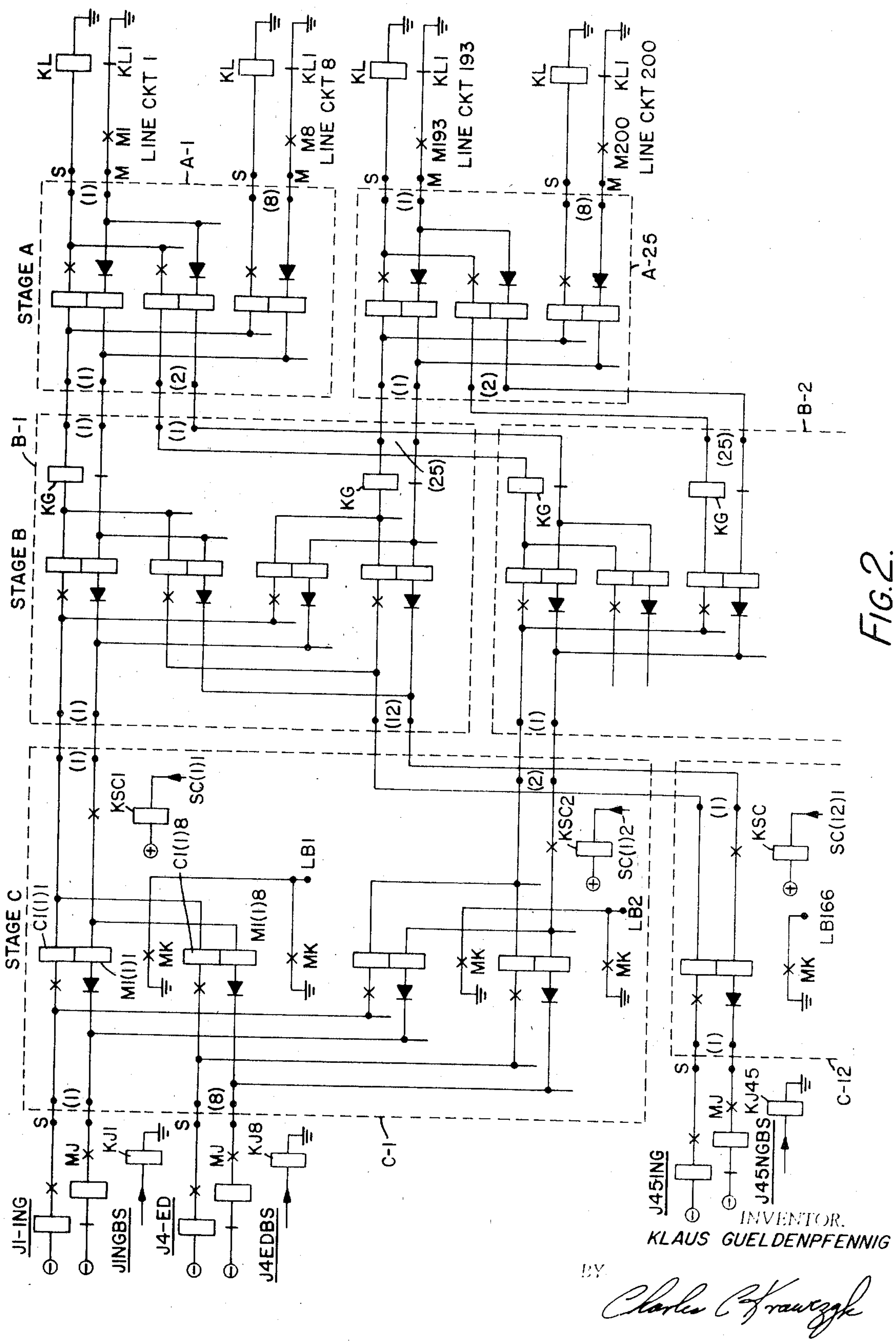
FIG. 2 is a more detailed block diagram of portions of the system shown in FIG. 1, especially switching matrix stages thereof.

Referring to FIG. 2, exemplary reed relay cross-point switches contained in matrices A1 and A25 of stage A; B1 and B2 of stage B and C1 and C12 of stage C are shown for purposes of a more detailed presentation of the embodiment of the invention shown in FIG. 1. The control relays of line circuits 1, 8, 193 and 200, as well as the free junctor selectors associated with the calling line of junctor J1; the called line of junctor J8 and the calling line of junctor J45 are also depicted.

A mark and sleeve lead is provided for each link. Both mark and sleeve are arranged in a series circuit from a source of voltage at the junctors to ground in the line circuits. Thus, no power, and therefore no buss wiring or fusing are necessary in the matrices. Each link in use is fused in its associated junctor and does not carry any current or have any voltage applied thereto when not in use. Sleeve circuits for holding and link marking are not required. The junctors are used to provide information storage for the status of a call.

Each link in each matrix includes a mark relay in the mark side and a control relay in the sleeve side. These relays are wound on the same bobbin in order to reduce the amount of current necessary to pull in the sleeve relays. The relays are multiplied, each link in each stage having as many relays as the number of inlets thereto. Thus, in matrix A1, 15 relays are provided for each of the 15 possible links between each line circuit and the 15 outlets. In matrix C1, there are eight relays for each link. The control relay C1(1)1 and mark relay M1(1)1, which is the first relay associated with link 1, is illustrated as is the control relay C1(1)8 and M1(1)8 of the eighth relay associated with link 1. Diodes which are provided across each relay coil to short-circuit inductive kickback are not shown in the drawing to simplify the illustration. A diode is also connected in series with each mark relay for decoupling purposes. Note that decoupling diodes are not used on the sleeve lead and are made unnecessary by virtue of the series connection of links and because the sleeve relays pull in only after their associated mark relays have done so.

The line circuits include a relay KL in the sleeve side which operates a break contact KL1 in the mark side when it is energized. Make contacts M1 through M200 are provided in the mark sides of the line circuits 1 through 200, respectively. These contacts may be closed by the operator or by a subscriber going off hook in the case of a calling subscriber. When a subscriber is called, the operator selects the called subscriber by closing the contact M8. Ringing current will then be connected to the subscriber line. In the event that the common control unit has equipment for automatically connecting the called line, it will effect closure of the contact M1 through M200 associated with the called subscriber. A guard relay KG is provided for each link in each matrix of stage B. It has a break contact in the side of each link and pulls in when holding current flows through the sleeve side.

The mark relays in each of the matrices have a make contact in series with their associated control relays and in series therewith in the sleeve side of the circuit. Accordingly, when the mark relays pull in, a connection is made to their associated control relays.

The mark relays in the stage C also have an additional marking contact MK associated therewith. This mark contact is a make contact which closes when its associated mark relay is energized and extends ground to a link busy LB terminal associated with the link to which its mark relay is connected. Thus, for example, if mark relay M(1)1 is energized, or if any of the other mark relays, such as M1(1)8, associated with link 1 of matrix C1 is energized, ground is connected at the line busy terminal LB1.

Each link in stage C also has a scanning relay KSC associated therewith. This relay includes a make contact in the sleeve side of the link. The scanning terminals are connected to the operating windings of these relays KSC, and when the control level (ground in the illustrated case) is connected thereto, the relay operates closing the make side of the link associated therewith. The link scanner LSC1 is connected to the terminals SC(1)1 through SC(1)15 of the matrix C1 and energizes the relay KSC1 associated with link 1 when that link appears to be selected.

The junctor includes control relays KJ1 through KJ8 in the case of junctors J1 through J4 associated with matrix C1;

other relays KJ being provided for each of the calling and called lines of the other junctors. A marking make contact MJ is closed when the relay KJ associated therewith pulls in. The control level J1NGBS through J4EDBS in the case of the junctors of group JG1 are maintained during the pendency of a call and may be used in the common control to indicate that the junctor is busy. Logic (not shown) connected to these leads provides the level JG1BS from the junctor group JG1 (FIG. 1) in the case where all of the junctors J1 through J4 of JG1 are in use. The mark side of each junctor selector circuit includes a relay having a slow to operate make contact in the sleeve circuit associated therewith. The sleeve circuit for each junctor also includes a relay having a break contact in the mark side for disconnecting the mark circuit of the junctor once a holding connection is established in the junctor sleeve.

Figure 3:
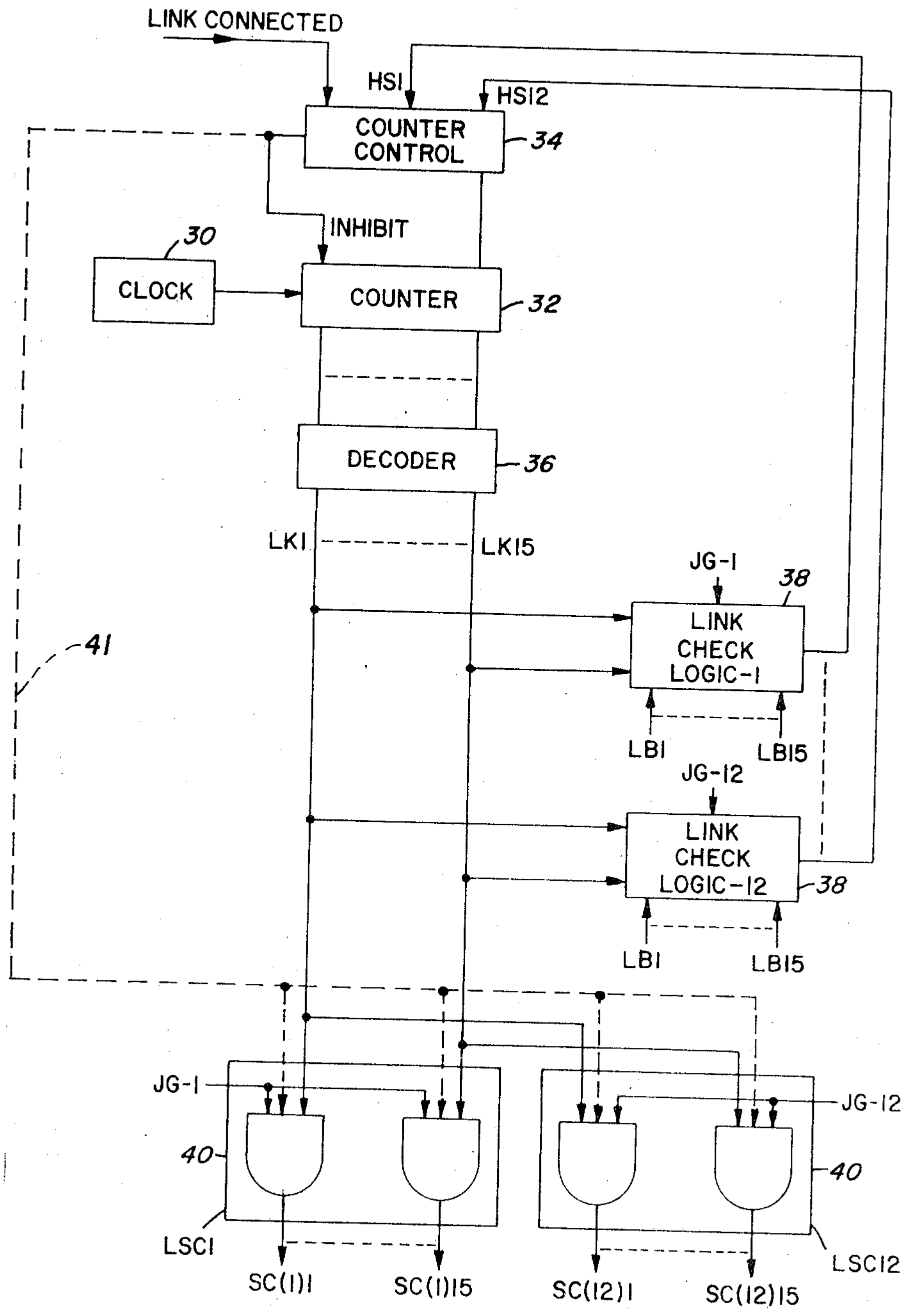
FIG. 3 is a simplified block diagram of the link scanners shown in FIG. 1.

Before considering the operation of the switching system shown in FIG. 2, reference should be had to FIG. 3 which illustrates the link scanners common circuitry, as well as the circuitry individual to the link scanners LSC1 through LSC12 for each matrix C1 to C12. The common circuitry includes a source of high frequency clock pulses 30, 480 kHz. being suitable. These pulses are applied to a multistage binary counter 32 which may be constituted of a plurality of JK flip-flop stages. A level on an inhibit line is applied from counter control logic 34 to inputs of the JK flip-flop stages in order to stop the count. The count will be stopped for a predetermined period of time. To this end, the counter control logic 34 may include a one-shot multivibrator which is triggered upon application of a hold scan pulse indicated as HS1 through HS12 on any of a plurality of hold scan lines, and provides the inhibit level to the counter 32. In the event that a "link connected" control level is not applied to the counter control logic 34, the inhibit level will be present for a period, say 30 milliseconds, sufficient for the control and marking relays in the matrices of the switching system to operate. The Link Connected level is obtained from the common control in response to operation of a relay in the sleeve side of a junctor OR gated from all the junctors. A link is taken as being connected upon operation of a junctor sleeve relay, whereupon the counter control inhibit level is removed and the counter operation may continue.

The common circuitry also includes a decoder 36 which translates the numbers stored in the counter 32 into an output pulse on one of 15 lines, each associated with a different one of the 15 links which may be provided in the matrices C1 through C12 of stage C. These outputs are indicated as LK1 through LK15. Individual to each link scanner is a separate link check logic circuit 38 and a relay drive circuit 40. Each link check logic circuit receive as inputs thereto the pulses LK1 through LK15 and one of the levels JG1 through JG12.

The level JG1 is obtained, for example, by logic circuits (not shown) in response to selection of any junctor in the group JG1. For example, the level JG1 may be provided by an OR gate connected to the J1NGBS through J4EDBS lines connected to the KJ relays which mark a selected junctor in junctor group JG1. Note that since only one junctor is selected at any one time, only one JG level will be produced at any one time.

Each link check logic also receives inputs from the link busy LB terminals for each link in the stage C matrix with which it is associated. Ground levels will appear on all LB terminals for the links which are marked busy.

Each Link Check Logic includes a multiplicity of AND gates associated with inverters. In the case of Link Check Logic–1 (which is associated with matrix C–1), a gate is provided for each LK input. The LB1 inputs are connected (through inverters if necessary) to different ones of the gates. The JG1 input is common to all of the gates. The outputs of all of the gates are combined in an OR circuit to produce a hold scan pulse corresponding to the first LK pulse associated with a free link as indicated by the absence of an LB ground level. The hold scan output from Link Check Logic–1 is indicated as HS1. This HS1 output will be coincident with the first free link and the LK pulse corresponding thereto.

Upon receipt of a hold scan pulse, the counter control 34 operates to produce an inhibit level stopping the counter 32. The LK pulse then persists as a level and is gated out through its associated AND gate in the relay driver circuits 40 to extend ground to one of the terminals SC(1)1 through SC(1)15 depending upon which link is selected. Although pulses continuously appear on the LK lines, before occurrence of a hold scan pulse, these pulses will be of insufficient duration to operate the KSC relays. Also, only the gates 40 of the link scanner associated with the selected junctor group will be enabled by virtue of the application of the JG level for that junctor group thereto.

Selection of a link is extremely rapid and is dictated principally by the repetition rate of the clock 30. The counter steps along at the high counting rate until a link in the junctor group is selected. Thereupon, a hold scan pulse is not produced until a free link is selected. In the event that a link is not selected within the 30-millisecond duration of the inhibit level, the counter is permitted to continue on until it reaches a count corresponding to the next free link in the matrix. As mentioned previously, the junctor may be selected by a nonhoming allotter which stops at the first free junctor (viz a junctor group having less than four busy junctors).

Consider now the operation of the switching system when a subscriber associated with a selected line circuit is a calling party. The allotter in the free junctor selectors will select the first junctor in the first junctor group which is not busy. Consider that junctor J1NG is selected. A J1NGBS level operates relay KJ1 and marking contact MJ of relay KJ1 closes. A JG1 enabling level is applied to the link scanner LSC1.

Assume that the first LK pulse to occur is LK1. An HS1 pulse is produced by link check logic 1 so as to operate the counter control logic which produces an inhibit level to stop the counter 32 (FIG. 2). The LK1 pulse (now a level) enables the AND gate on the left-hand side of the drivers 40 so as to extend ground to terminal SC(1)1. Relay KSC for the first link pulls in. Relay M1(1)1 also pulls in since contact MJ is closed in the mark side of J1ING. A series circuit is completed between the mark side of link 1 at outlet (1) of matrix C–1 and a source of negative potential at the junctor J1ING. This potential is now applied to the inlet (1) on the mark side of stage B. The only path from the mark side of stage B to line circuit 1 is through link (1) of matrix B1 and link (1) of matrix A1. Since these links are not busy, the mark relays therein pull in closing the contacts associated therewith on the sleeve sides of the circuit.

Note that the relay in the mark side of junctor J1ING is slow to operate. Accordingly, no current flows through the sleeve side contacts while they close. Such "dry" closure of reed relays extends their life. Immediately after the contacts of the mark relays in the matrices close, the sleeve side contact of the relay in the mark side of the junctor closes, thereby permitting current to flow through the sleeve side of the selected links. The control relay in the sleeve side of the junctor J1ING breaks the connection to the voltage source on the mark side. The guard relay KG for link 1 also opens the mark side of link 1 of stage B. The relay KL in the line circuit which opens contact KL1 associated therewith. Thus, when the sleeve side of the selected link is energized, the mark side of the link is completely disconnected at the junctor circuit, line circuit and stage B matrix. The control relays in the links remain connected until the call is terminated, either by the operator or by one of the interconnected parties going on hook. To this end, another contact may be provided in the sleeve of the line circuit which can be disconnected either by the subscriber going on hook or by the operator.

A called party is selected when the operator is already connected to a calling party through a junctor. The junctor group level JG associated with the called side of the selected junctor is provided the link scanner to allow scanning of the 15 links in the C matrix connected to the called junctor. Another free link in the one of the C stage matrices associated with the called junctor is selected as described above. The called line circuit is marked by the M contacts of the called line circuit and connection is extended to the selected C stage link via a stage B link and a link in a stage A matrix which is connected to the called line circuit.

After the matrix circuit is completed in the selected A, B and C stage links, the sleeve circuit associated therewith pulls in, thereby releasing the mark circuit as previously described.

In the event that link 1 of matrix B1 is busy, it becomes necessary to select another link in matrix C1. The next link may, for example, be link 2. This link is associated with matrix B2. Accordingly, link 1 of matrix B2 and inlet 2 of matrix A2 may be used to extend the connection to the line circuit 1. The scanner will therefore search until a free link is available which will find a path from the selected junctor to the marked line circuit.

It should be understood, of course, that although the scanning relay (KSC) has been illustrated as the means for sequentially scanning the mark links in synchronism with the link check logic circuit, various semiconductor switching devices can also be used to replace the contacts of the relays KSC. In such event, an individual semiconductor switching device will be connected in series with the separate mark links. Since semiconductor devices can rapidly respond to switching signals, the circuitry of FIG. 3 can be modified to include the connection 41 (illustrated in phantom) between the inhibit output of the counter control 34 and a third input circuit of the AND gates of the drivers 40. The outputs of the drivers 40 (SC(1)1 through SC(1)15) will be connected to actuate the semiconductor switching devices. The arrangement is such that the AND gates of the drivers 40 will not be fully enabled until a free path through the network has been found and the counter control logic 34 generates the inhibit level.

Figure 4:
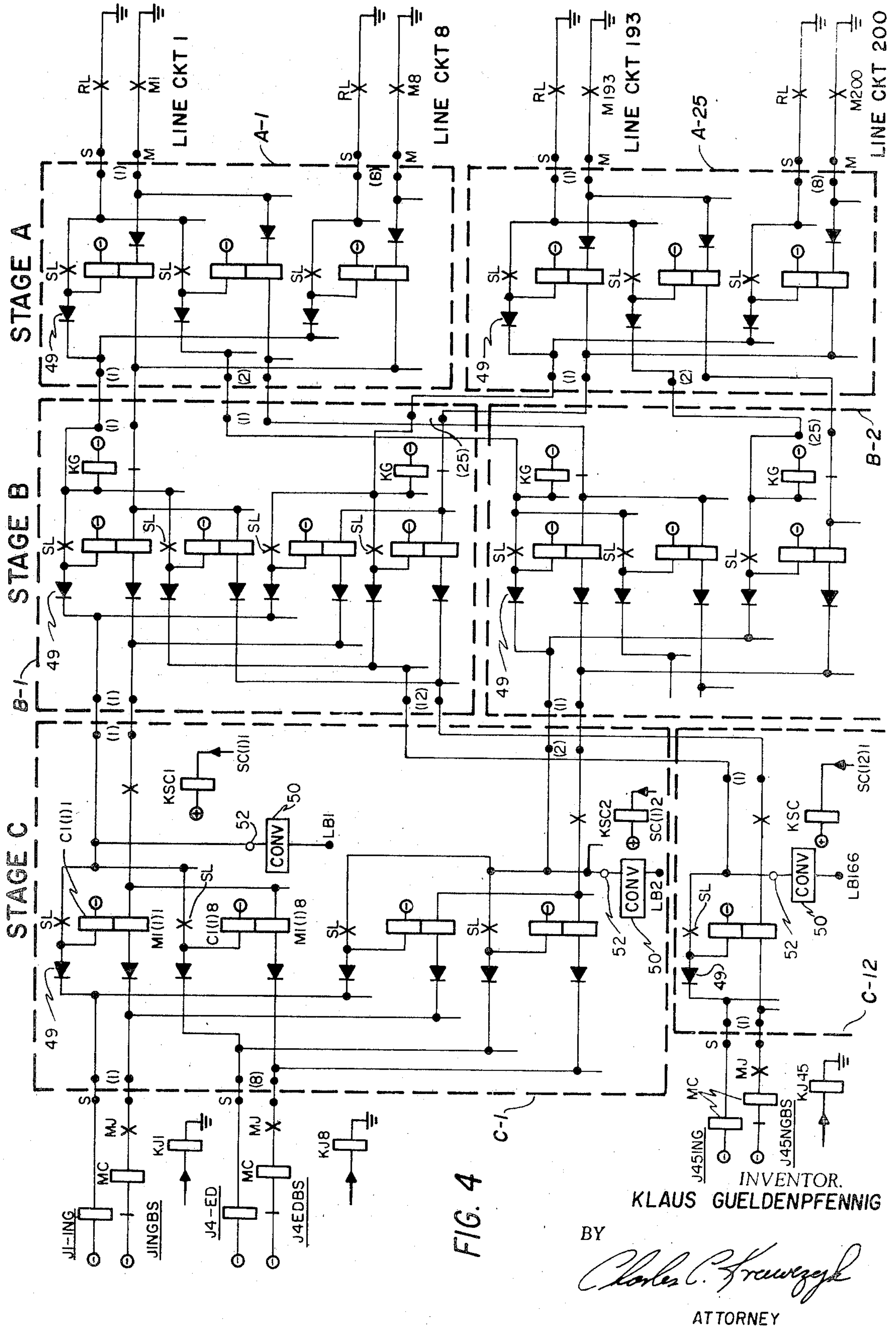
FIG. 4 is a detailed diagram of the system shown in FIG. 1, especially switching matrix stages thereof, including the path-finding system of the invention.

In accordance with the invention of the present application, the circuit of FIG. 2 is modified in FIG. 4 so that the sleeve coils (upper coils) of the mark relays are connected in a parallel arrangement rather than the series arrangement of FIG. 2. For purposes of simplifying the explanation of the circuit of FIG. 4, the same reference letters and numerals of FIG. 2 will apply to the same circuit components in FIG. 4. One end of each of the sleeve coils are connected to a negative power source while the other end is connected to the junction of a decoupling diode 49 and the make contacts SL of the same relay. The make contacts SL and the decoupling diodes 49 of each of the stages A, B and C are connected in a series circuit between the sleeve terminals (S) at opposite ends of the network. It is to be understood, of course, that the decoupling diodes 49 could be replaced by additional make contacts of the same mark relay. In addition, the guard relays KG are also connected in parallel rather than the series arrangement of FIG. 2, with one end of the coil of relays KG connected to the negative power source and the other end of the coil connected to the sleeve link interconnections between stages A and B. The KL relay and its contacts KL1 (in the line circuits) are eliminated and the make contacts RL are inserted in series with the sleeve lead (S). The contacts RL are closed by a time delay circuit that can be actuated by the relay MC in series with the junctor make leads to provide a "dry" closure of the contacts SL, and also to provide a means for releasing the connections by the subscriber going on hook, or by the operator.

The make contacts MK have been eliminated in FIG. 4. Rather than requiring a separate contact for each of the mark relays for designating the busy-free condition of the particular link, a separate converter circuit 50 is connected between individual ones of the sleeve link connections to the stage C modules and corresponding LB terminals. The converter circuit 50 functions to distinguish between an open circuit and the presence of a low potential of approximately −1.4 volts (an established connection) on its connected sleeve link. In the event that the decoupling diodes 49 are replaced by make contacts, an established connection to a sleeve coil will apply a ground signal to the connected converter circuit. In addition to the foregoing, the interconnection of the decoupling diodes 49 and SL contacts in stages B and C, or both, can be reversed, in such event, the converter circuit 50 will distinguish between the presence of the high energization potential from the negative source when free and the low potential when busy. When a mark relay is actuated, the circuit to its sleeve coil is completed for maintaining the relay actuated after the mark coil is deenergized. Therefore, a low potential on the sleeve coil resulting from the completion of the circuit to the sleeve coil of the actuated relay provides a signal designating that the relay is actuated and its corresponding link connections are busy. The converter circuit 50 functions to distinguish between the low potential signal and an open circuit (or high potential) to provide a ground signal on its connected LB lead when its link is busy, and thereby functions in essentially the same manner as the MK contacts of FIG. 2.

Figure 5:
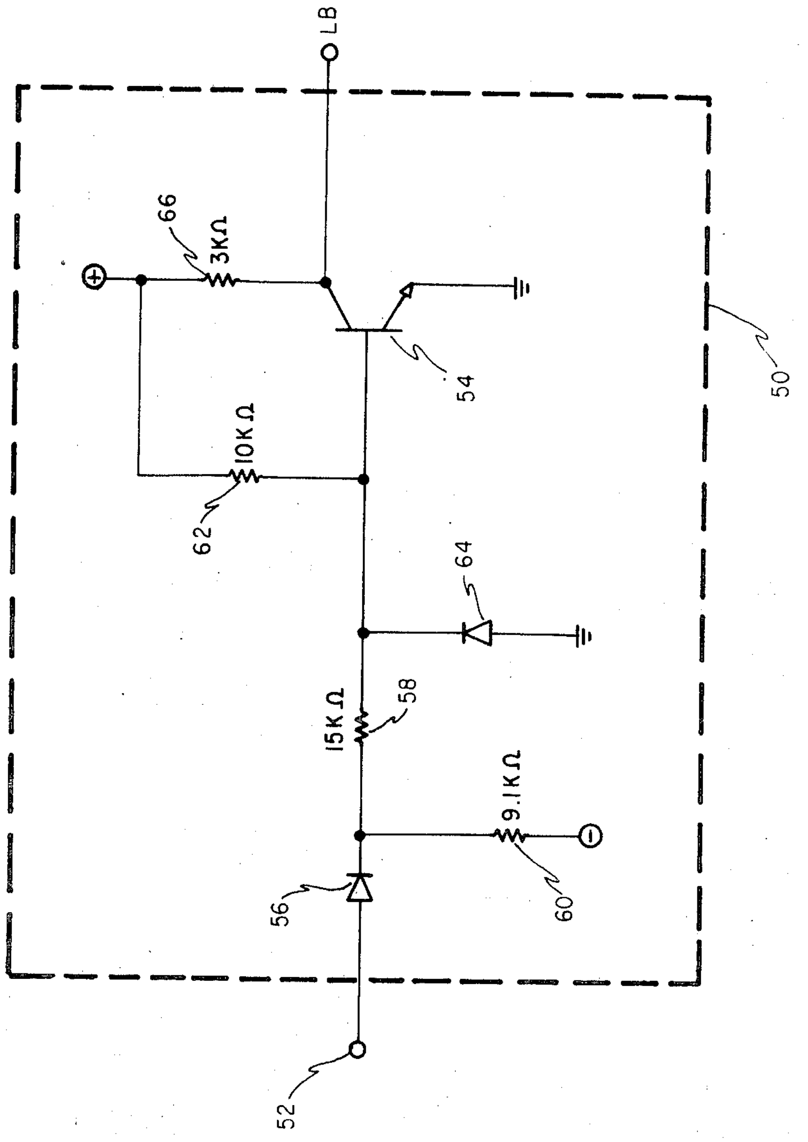
FIG. 5 includes a schematic drawing of an embodiment of the converter circuits of FIG. 4.

FIG. 5 is a schematic diagram of an embodiment of a converter circuit 50 for the path-finding system of FIG. 4. The input terminal 52 is adapted to be connected to a sleeve link connection as illustrated in FIG. 4. The terminal 52 is connected to a base of a switching transistor 54 via a diode 56 and a resistor 58. A resistor 60 is connected between the junction of the diode 56 and the resistor 58 and a negative power supply terminal corresponding to the negative power source connected to the network of FIG. 4. A biasing resistor 62 is connected between a positive power supply (such as 5 volts) and the base of the transistor 54. A diode 64 is connected between the base of the transistor and ground to limit the amplitude of the negative potential that can be applied thereto. The collector of the transistor 54 is connected to the positive power supply via a resistor 66 while its emitter is connected to ground. The collector is also connected to a LB terminal.

As previously mentioned, the LB terminals are connected to the link check logic circuits (FIG. 3). In operation, when the link is free, the circuit to the link sleeve is open (or a high negative potential is present), a negative biasing potential is developed at the base of the transistor 54 to cut off the transistor and apply a high level signal to the terminal LB indicating that the sleeve link is free. On the other hand, when the circuit to the sleeve link is established, a low potential (in the order of −1.4 volts) is present at the terminal 52. The values of the resistors 58, 60 and 62 are selected so that when the low level potential is present at the terminal 52, a positive biasing potential is applied to the base of the transistor 54 that saturates the transistor, which, in turn, applies a ground signal to the terminal LB designating that the sleeve link is busy. Hence, it can be seen that the link scanner circuitry of FIG. 3 functions with the converter circuits 50 of FIG. 4 in the same manner as previously set forth with regards to the MK contact of FIG. 2.

In operation, assume that junctor J1ING is selected to be connected to line circuit 1. In such event, the junctor relay KJ1 is operated closing the marking contact MJ, and the line circuit contacts M1 are also closed. A JG1 enable level is applied to the scanner LSC1. Assume that the first LK pulse to occur is LK1, and that the link connected to relay M1(1)1 is free. The absence of a ground at terminal LB1 will indicate that the corresponding link is free and an HS1 pulse is produced by link check 1 so as to operate the counter control logic which produces an inhibit level to stop the counter 32. The LK1 pulse (now a level) operates the corresponding AND gate of the drivers 40 so as to extend ground to terminal SC(1)1, to pull in relay KSC1, which, in turn, completes the mark path through the relays M1(1)1 in stages A, B and C. The circuit for the sleeve coils will be closed via the SL and RL contacts and decoupling diodes 49, and the mark circuit will be opened thereby completing the connection sequence for the network.

Although the circuit of FIG. 4 includes an arrangement wherein a low potential signal is present at the sleeve link when busy, the network arrangement can also be modified to include circuitry wherein the sleeve links will have a high potential when busy. In such an arrangement, one end of the sleeve coils will be grounded rather than connected to a negative power supply. Furthermore, the polarity of the decoupling diodes 49 connected to the sleeve coils will be reversed to operate with the grounded sleeve coils. In such an arrangement, the converter circuits 50 will be modified to produce a ground signal when a high negative potential is present at the terminal 52.

What is claimed is:

1. A path-finding system for effecting interconnection of circuits through a switching network, wherein said network includes a plurality of matrix stages interconnected to provide plural mark paths and corresponding plural holding paths between circuits connected to opposite ends of the network, wherein each stage is divided into a plurality of separate matrix groups, wherein each matrix group includes a plurality of cross-point relays arranged to form a matrix switch, and wherein the relays include a mark winding and a hold winding, with the mark windings connected in the mark paths, and with the hold windings connected in corresponding holding paths through contacts of separate ones of the relays that include the respective hold windings, said path finding system comprising:
   - means for selectively marking circuits connected to the matrix groups in the stages at opposite ends of the network;
   - means for sequentially detecting the busy-free conditions of the individual holding path connections to matrix groups in one stage, which matrix groups include paths for interconnecting the marked circuits;
   - circuit means, responsive to the detection of a free-holding path connection, defining a free path through the network between marked circuits, for completing the free mark path through the network, and
   - circuit means responsive to the completion of the mark interconnection for completing a corresponding hold path through the network and releasing the mark path.

2. A path finding system as defined in claim 1 including:
   - switching means connected in series with mark paths connected to matrix groups in one of the stages for disabling mark paths when its corresponding holding paths are busy.

3. A path finding system as defined in claim 2 wherein said circuit means responsive to the detection of a free holding path includes:
   - a plurality of groups of switch means, a separate group of switch means for each of the matrix groups in one stage, and wherein separate ones of said switch means in said plurality of groups are connected in series with individual ones of said mark path connections to the matrix groups in said one stage;
   - means for sequentially applying enabling signals, synchronized to said sequential detecting means, to a selected group of switch means included in the mark paths interconnecting the marked circuits at a rate wherein said switch means do not respond to said enabling signals, and
   - means for stopping said applying means when a free path is detected so that an enabling signal is applied to said switch means in the mark path of a detected free path for a sufficient period of time to complete a mark path through the network between marked circuits at opposite ends of the said network.

4. A path finding system as defined in claim 2 wherein said circuit means responsive to the detection of a free-holding path includes:
   - a plurality of groups of switch means, a separate group of switch means for each of the matrix groups in one stage, and wherein separate ones of said switch means in said plurality of groups are connected in series with individual ones of said mark path connections to the matrix groups in said one stage;
   - means for sequentially applying a first signal synchronized to said sequential detecting means to a selected group of switch means included in mark paths for interconnecting the marked circuits;
   - means for stopping said first signal applying means when a free path is detected so that said first signal applying means applies a continuous signal to the switch means in the mark path of said detected free path, and
   - means for applying a second signal to the switch means in said free path when said first signal applying means is stopped so that said switch means in said detected free path is actuated by the simultaneous presence of said first and second signals to complete a mark path between marked circuits on opposite ends of said network.

5. A path-finding system for effecting interconnection of telephone circuits through a switching network wherein said network includes a plurality of switching matrix stages to provide plural mark paths and corresponding plural holding paths between telephone circuits connected to opposite ends of the network, wherein each matrix stage includes a plurality of cross-point relays arranged to form matrix switches, wherein the relays include a mark winding and a hold winding, and wherein the mark windings are interconnected between adjacent stages by mark leads for controlling the actuation of said cross-point relays and the hold windings are interconnected between adjacent stages by holding leads for maintaining the relays actuated to provide plural paths between telephone circuits connected to opposite ends of said network, said path finding system comprising:
   - means for selectively marking the mark leads of telephone circuits connected to the matrix stages on opposite ends of said network;
   - a plurality of switch means, separate ones of the switch means being connected in series with individual ones of the mark lead interconnections between two stages;
   - scanning means for sequentially enabling said plurality of switch means in mark lead interconnections that include paths for connecting the marked telephone circuits, wherein the time duration the switch means are enabled is insufficient to actuate the switch means;
   - switching means connected in the mark lead interconnections between two other stages for disabling the mark lead interconnections therebetween corresponding to busy holding paths;
   - means for detecting a signal indicating a free condition in the holding lead interconnection corresponding to the scanned mark lead interconnections and for stopping said scanning means so that the switch means in the corresponding mark lead interconnection are enabled for a sufficient duration to be actuated to complete a free mark path between marked telephone circuits on opposite ends of said network, and
   - circuit means responsive to the completion of the mark path for completing a corresponding hold path and releasing the mark path.

6. A path-finding system for effecting interconnection of telephone circuits through a switching network wherein said network includes a plurality of switching matrix stages to provide plural mark paths and corresponding plural holding paths between telephone circuits connected to opposite ends of the network, wherein each matrix stage includes a plurality of cross-point relays arranged to form matrix switches, wherein the relays include a mark winding and a hold winding, and wherein the mark windings are interconnected between adjacent stages by mark leads for controlling the actuation of said cross-point relays and the hold winding are interconnected between adjacent stages by holding leads for maintaining the relays actuated to provide plural paths between telephone circuits connected to opposite ends of said network, said path-finding system comprising:
   - means for selectively marking the mark leads of telephone circuits connected to the matrix stages on opposite ends of said network;
   - a plurality of switch means, separate ones of the switch means being connected in series with individual ones of the mark lead interconnections between two stages;

scanning means for sequentially applying a first switching signal to the plurality of switch means in mark lead interconnections that include paths for connecting the marked telephone circuits;

switching means connected in the mark lead interconnection between two other stages for disabling the mark lead interconnections therebetween corresponding to busy paths;

means for detecting a signal indicating a free condition in the holding lead interconnection corresponding to the scanned mark lead interconnections for stopping said scanning means so that said first switching signal is continuously applied to the switch means in the corresponding mark lead interconnection while said scanning means is stopped;

circuit means for enabling the switch means receiving said first switching signal when said scanning means is stopped so that switch means completes the free marked path, and circuit means responsive to the completion of the mark path for completing a corresponding hold path and releasing the mark path.

* * * * *